United States Patent [19]

McDonald et al.

[11] 4,032,378
[45] June 28, 1977

[54] METHOD OF FORMING PATTERN ROLL

[75] Inventors: James L. McDonald; Christian Toussieux, both of Charlotte, N.C.

[73] Assignee: Consolidated Engravers Corporation, Charlotte, N.C.

[22] Filed: Sept. 3, 1976

[21] Appl. No.: 720,204

Related U.S. Application Data

[62] Division of Ser. No. 522,785, Nov. 11, 1974, Pat. No. 3,993,532.

[52] U.S. Cl. .............................. 156/645; 156/153; 156/651; 156/659; 156/664
[51] Int. Cl.² .......................................... C23F 1/02
[58] Field of Search ............. 156/6, 8, 14, 18, 153, 156/154; 96/36.3, 37; 29/121 R, 121 A, 121 H; 228/1, 110; 427/436, 445

[56] References Cited

UNITED STATES PATENTS

| | | | |
|---|---|---|---|
| 3,022,231 | 2/1962 | Broderick | 204/25 |
| 3,177,104 | 4/1965 | Miller | 156/14 |

*Primary Examiner*—William A. Powell
*Attorney, Agent, or Firm*—Richards, Shefte & Pinckney

[57] ABSTRACT

A pattern roll is provided for use in opposition to a sonic horn for fusing responsive material interposed between the roll and horn. The pattern of the roll is formed integrally on the roll body in a manner that provides a much more serviceable roll and one in which the pattern possibilities are greatly increased in relation to pattern rolls of this sort heretofore available.

4 Claims, 8 Drawing Figures

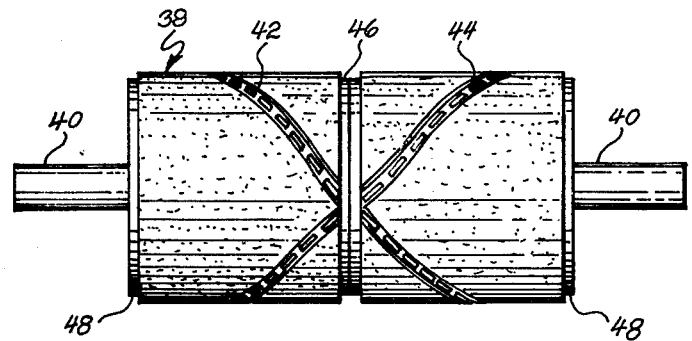

```
┌─────────────────────┐
│    PREPARE MILL     │
└──────────┬──────────┘
           │
┌──────────┴──────────┐
│ APPLY MILL TO ROLL FOR │
│ PARTIALLY RAISING PATTERN │
└──────────┬──────────┘
           │
┌──────────┴──────────┐
│  COAT PARTIALLY RAISED │
│  PATTERN WITH RESIST   │
└──────────┬──────────┘
           │
┌──────────┴──────────┐
│   ETCH ROLL TO BASE    │
│   OF PATTERN RISE      │
└──────────┬──────────┘
           │
┌──────────┴──────────┐
│ REPEAT MILL APPLICATION │
│ AND ETCHING UNTIL PATTERN │
│    IS FULLY RAISED      │
└──────────┬──────────┘
           │
┌──────────┴──────────┐
│ ABRADE FACES OF PATTERN │
│ ELEMENTS TO EVEN HEIGHT │
│ AND CONCENTRIC CURVATURE │
└──────────┬──────────┘
           │
┌──────────┴──────────┐
│   CHROME PLATE ROLL    │
└─────────────────────┘
```

METHOD OF FORMING PATTERN ROLL

CROSS-REFERENCES TO RELATED APPLICATIONS

This is a division of copending application Ser. No. 522,785, filed Nov. 11, 1974, now U.S. Pat. No. 3,993,532.

BACKGROUND OF THE INVENTION

The use of ultrasonic energy for combining responsive materials in web-size widths, as in quilting, involves provision of a pattern roll for supporting the material being combined in relation to a series of sonic horns so that the ultrasonic energy is converted to heat at the output surfaces of the horns wherever the pattern roll acts as an opposing anvil. U.S. Pat. No. 3,733,238 illustrates and describes an arrangement of such apparatus. The pattern rolls heretofore available for use in apparatus of this sort have been formed by drilling the roll body to receive pin elements in a particular pattern. When pin elements are installed in this way, however, the process of roll formation is not only particularly tedious, but it is also difficult to maintain the pins at an even projecting height, and it is additionally difficult to secure the pins in place adequately for extended roll use because the sonic horn action generates a severe tendency to vibrate them loose.

The present invention eliminates these difficulties and further allows considerably greater pattern possibilities than prior practice has permitted.

SUMMARY OF THE INVENTION

According to the present invention a pattern roll for sonic horn opposition is formed by preparing a mill for a predetermined pattern of discrete horn opposing elements projecting from a base rib, applying the mill to a roll body for partially raising the pattern at the roll body surface, coating the partially raised pattern with a resist and etching the roll body to the base of the pattern rise, and then repeating the mill application and etching steps until the predetermined pattern is fully raised at the roll body surface.

The resulting pattern roll has the horn opposing elements and the base rib from which they project formed integrally with the roll body and at a regular height, and following the predetermined pattern both as to course of the base rib and crosssectional shape and spacing of the horn opposing elements. Thus in the case of quilting or the like it is possible to shape the projecting elements and space them so that the fusing of interposed quilting material produces an exterior appearance that simulates stitching quite closely, or to produce other effects as desired. Also, the course of such apparent stitching can be made to follow a regular geometric design, based on a diamond for example, or a design that is highly fancy or that is adapted to outline ornamental figures, such as a flower, borne by the material being quilted. Additionally, the cross-sectional shape of the projecting elements may be varied at will to be circular or rectangular, or to have the shape of a diamond or a star, or a variety of other shapes as may be desired in particular instances.

These and other features of the present invention are described in further detail below in connection with the accompanying drawings listed below.

DESCRIPTION OF THE DRAWINGS

FIG. 7 is an elevation of a mill such as is used in forming pattern rolls according to the present invention; and FIG. 8 is a block diagram indicating the procedural sequence for forming pattern rolls according to the present invention.

DETAILED DESCRIPTION OF THE INVENTION

Figure 1:
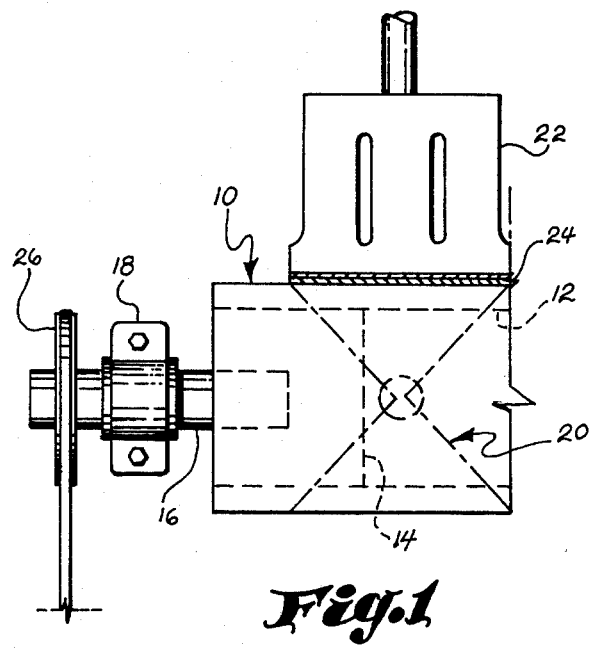
FIG. 1 is a fragmentary elevation indicating the general structure and operating disposition of a pattern roll embodying the present invention.

A pattern roll embodying the present invention is indicated at 10 in FIG. 1 as suitably comprising a tubular shell 12 fitted with end headers 14 at which stub shafts 16 are installed for journaling in pillow blocks as at 18 so that a pattern 20 raised at the surface of roll 10 may be disposed in opposition to sonic horns 22 to act on interposed material 24. A pulley drive 26 is provided to rotate roll 10 so that its opposing action takes place as the interposed material 24 travels between the roll and horns 22.

Figures 2, 3:
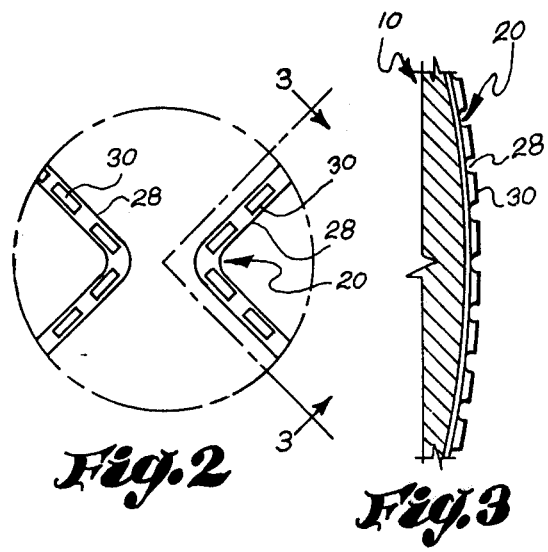
FIG. 2 is an enlarged detail of roll surface portion enclosed by the broken line circle in FIG. 1.
FIG. 3 is a sectional detail taken substantially at the line 3—3 in FIG. 2.

The nature of the pattern 20 raised at the surface of roll 10 is indicated representatively in FIGS. 2 and 3 as being formed by a continuous base rib 28 from which discrete horn opposing elements 30 project in spaced relation. A mill is used to raise the pattern 20, as will be noted further presently, and the mill provided for this purpose is preferably prepared for a widthwise repeat of the pattern involved at a width corresponding to that of the sonic horns 22 so that this pattern repeat can be raised on the roll 10 at lengthwise spacings opposing a repeat at each sonic horn. By such an arrangement the alignment of pattern elements within each repeat is maintained regularly, and proper tuning of the sonic horns is made easier.

The roll 10 bearing as many repeats of pattern 20 as are needed to process the material 24 being handled has the horn opposing elements 30 finished at an even projecting height and with a projecting face curvature concentric with the roll axis. In further particular, the horn opposing elements 30 taper from the base rib 28 at which they project and are limited in projecting height sufficiently for mill release during formation, while the base rib 28 is raised on the roll 10 sufficiently to provide an aggregate height of base rib and horn opposing elements sufficient to accommodate the interposed material 24 readily between the roll 10 and sonic horns 22. For example, in handling quilting of the sort illustrated in FIGS. 4 and 5 the pattern roll 10 employed was found with horn opposing elements 30 that projected 0.040 inch at a 0.015 inch taper from a base rib 28 that was raised sufficiently to provide an aggregate height of 0.090 inch.

Figure 4:
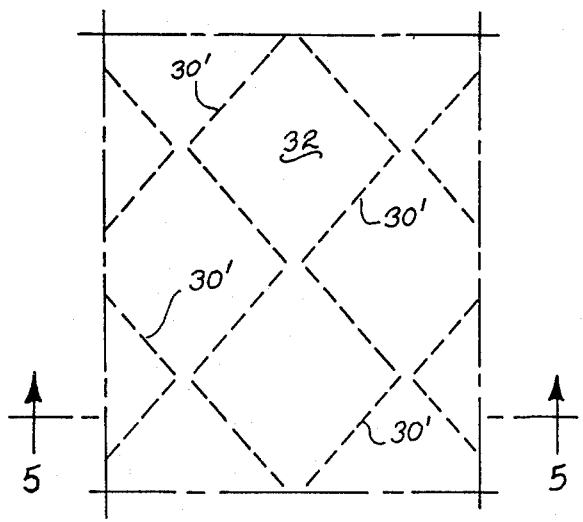
FIG. 4 is a plan view of a quilting pattern produced with the FIG. 1 pattern roll.
Figure 5:
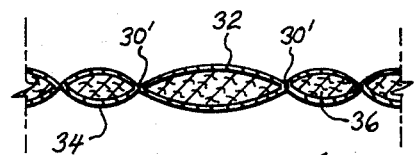
FIG. 5 is a sectional detail taken substantially at the line 5—5 in FIG. 4.

FIGS. 4 and 5 illustrate a quilting produced with a pattern roll 10 of the form shown in FIGS. 1-3 from face and back plies 32 and 34 of 50/50 cotton-polyester fabric covering an interposed non-woven batt 36 of 100% polyester fiber. The effect of pattern roll 10 is to cause these responsive materials to fuse or bond or weld in the pattern of the horn opposing elements 30 as a result of the heat conversion thereat from the sonic horn action. The illustrated pattern roll 10 is formed to simulate stitching which appears in the quilting as indicated at 30′. FIG. 4 shows a full widthwise repeat centrally with partial repeats indicated at each side. The number of such repeats will, of course,, depend on the desired width of the quilting being produced, and the pattern roll 10 will have as many repeats from lengthwise thereof as are needed for the quilting width desired. A common pattern roll arrangement is one formed with 15 repeats, each about 8½ inches wide.

Figure 6:
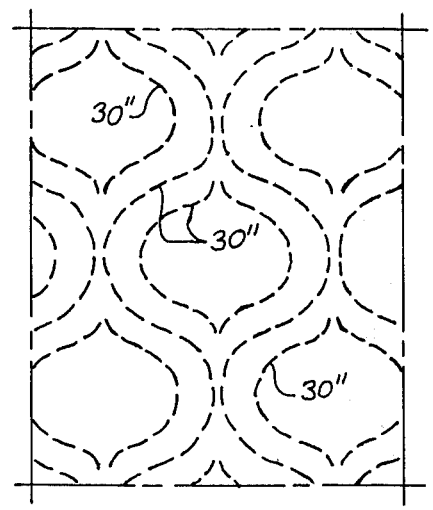
FIG. 6 is a plan view corresponding generally to FIG. 4 but showing a fancier quilting pattern such as is readily within the capability of pattern rolls formed according to the present invention.

FIG. 6 illustrates the same sort of quilting bonded with a varied pattern of simulated stitching 30″ such as may be formed with equal facility by a pattern roll embodying the present invention. Alternatively, if the covering face ply of the quilting is decorated with figures of any sort the bonding pattern can be arranged in relation to such figures so as to outline them for emphasis. Also, the bonding points are not limited to simulating stitching, but may have any cross-sectional form desired, as noted earlier. In short, the pattern roll arrangement can be made to follow a desired predetermined design as to course of base rib 28 and cross-sectional shape and spacing of the horn opposing elements 30 with wide flexibility.

A mill 38 of the sort employed for forming a pattern roll 10 corresponding to that shown in FIGS. 1-3 is illustrated in FIG. 7 as comprising a cylindrical body having journal portions 40 extending axially at each end and having a diameter allowing an exactly even multiple of the running pattern repeat to be formed in relief circumferentially thereof, while the axial length of the mill body is proportioned for a single widthwise repeat. In this case only a single running repeat of the pattern is formed, and, in addition to the pattern relief for the base rib 28 at 42 and for the horn opposing elements 30 at 44, central circumferential groove 46 and circumferential half grooves 48 at each end are formed in the mill body to raise corresponding ridges during pattern formation that aid in maintaining proper mill registration and in the final finishing of the roll. Upon preparation of the mill 38 in the foregoing form it is flame hardened for use. The mill 38 is suitably formed of 1018 carbon steel, as is the pattern roll 10.

To raise the pattern on roll 10 the mill 38 is applied thereto by mounting it for rotation in a fixture by which it can be brought to bear at the surface of roll 10 with the latter supported in a stand equipped with means for rotating the roll body. The diameter of the pattern roll body is checked at this time to determine whether it will accept an exactly even multiple of the running pattern repeat from the mill 38. As the blank roll body is purposely provided slightly oversize, some turning down will be necessary to fit the pattern repeat.

Once this has been done, enough pressure is exerted on the mill 38 to cause a partial raising of the pattern at the roll surface to the extent that the materials involved will allow. The mill 38 is then withdrawn and the partially raised pattern is coated with a resist, such as beeswax, and then etched to the base of the pattern rise. Thereafter the mill application and etching steps are sequentially repeated until the pattern has been fully raised at the roll surface. As the mill 38 is formed with only one widthwise repeat, the foregoing procedure must be duplicated for each such repeat required. Preferably the first repeat is raised at the lengthwise center of the roll and the additionally required ones alternately toward each end.

When all of the required widthwise repeats have been fully raised, the horn opposing elements 30 are abraded to an even projecting height and with a projecting face curvature concentric with the roll axis. For this purpose the elements 30 are raised about .010 inch beyond the final height desired and the abrading means is moved lengthwise of the roll while the roll is turned. During this step the circumferential ridges raised by the mill grooves 46 and 48, and to which resist has also been applied serve to stabilize the abrading means and thus facilitate the finishing of elements 30. After the abrading step the circumferential ridges are removed from the roll surface and the roll body is then chrome plated to improve its wear resistance and protect it against rusting during use.

Because the thus formed pattern roll has the pattern raised as an integral part thereof, it provides an excellent service life that is much improved over the rolls heretofore available for this purpose. Also, the pattern elements in each repeat are maintained in perfect alignment according to the present invention, and adjacent widthwise repeats are also readily aligned within acceptable limits.

The present invention has been described in detail above for purposes of illustration only and is not intended to be limited by this description or otherwise to exclude any variation or equivalent form or procedure that would be apparent from, or reasonably suggested by, the foregoing disclosure to the skill of the art.

We claim:

1. The method of forming a pattern roll for use in opposition to a sonic horn for fusing heat responsive material interposed therebetween, which method comprises preparing a mill for a predetermined pattern of discrete horn opposing elements projecting from a base rib, applying said mill to a roll body for partially raising said pattern at the roll body surface, coating the partially raised pattern with a resist and etching the roll body to the base of the pattern rise, and then repeating the mill application and etching steps until the predetermined pattern is fully raised at the roll body surface.

2. The method of forming a pattern roll as defined in claim 1 wherein said roll is rotated during application of the mill thereto for raising said pattern.

3. The method of forming a pattern roll as defined in claim 1 wherein the projecting faces of the fully raised horn opposing elements are abraded to an even projecting height and with a curvature concentric with the roll axis.

4. The method of forming a pattern roll as defined in claim 3 wherein, after fully forming and abrading the raised pattern, said roll body is chrome plated.

* * * * *